US011432196B2

(12) United States Patent
Itoh et al.

(10) Patent No.: US 11,432,196 B2
(45) Date of Patent: Aug. 30, 2022

(54) CONTROL DEVICE, CONTROL METHOD, AND NON-TRANSITORY COMPUTER READABLE MEDIUM STORING PROGRAM

(71) Applicant: NEC Corporation, Tokyo (JP)

(72) Inventors: Nobuhiko Itoh, Tokyo (JP); Takanori Iwai, Tokyo (JP); Takahiro Nobukiyo, Tokyo (JP); Motoki Morita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 16/761,591

(22) PCT Filed: Oct. 29, 2018

(86) PCT No.: PCT/JP2018/040043
§ 371 (c)(1),
(2) Date: May 5, 2020

(87) PCT Pub. No.: WO2019/093167
PCT Pub. Date: May 16, 2019

(65) Prior Publication Data
US 2020/0275317 A1 Aug. 27, 2020

(30) Foreign Application Priority Data
Nov. 10, 2017 (JP) .............................. JP2017-217495

(51) Int. Cl.
H04W 4/00 (2018.01)
H04W 28/14 (2009.01)
(Continued)

(52) U.S. Cl.
CPC ......... H04W 28/14 (2013.01); H04L 41/5019 (2013.01); H04W 28/06 (2013.01)

(58) Field of Classification Search
CPC ..... H04W 80/04; H04W 88/06; H04W 88/08; H04W 84/18; H04W 28/14; H04W 28/06;
(Continued)

(56) References Cited

U.S. PATENT DOCUMENTS 6,469,991 B1  10/2002  Chuah
8,270,369 B1 *  9/2012  Chang ................. H04W 36/026
                                             370/331

(Continued)

FOREIGN PATENT DOCUMENTS

JP   H11-289351 A   10/1999
JP   2000-286893 A  10/2000
(Continued)

OTHER PUBLICATIONS

International Search Report for PCT Application No. PCT/JP2018/040043, dated Dec. 18, 2018.
(Continued)

Primary Examiner — Phuongchau Ba Nguyen
(74) Attorney, Agent, or Firm — Sughrue Mion, PLLC

(57) ABSTRACT

To provide a control device that can prevent an increase in a processing load and that can effectively allocate a radio resource. A control device (30) according the present disclosure includes: a deciding unit (31) configured to decide whether or not an interval between generation of a first flow that is generated when performing radio communication between a communication terminal (10) and a base station (20) and generation of a second flow that is generated after the generation of the first flow exceeds a permissible delay time of the first flow; and a determination unit (32) configured to determine deletion of non-transmitted data related to the communication terminal (10) after lapse of the permis-
(Continued)

sible delay time of the first flow when it is decided that the generation interval exceeds the permissible delay time of the first flow.

19 Claims, 10 Drawing Sheets

(51) Int. Cl.
*H04L 41/5019* (2022.01)
*H04W 28/06* (2009.01)

(58) Field of Classification Search
CPC ...... H04W 28/24; H04W 56/00; H04L 29/06; H04L 41/5019; H04L 47/32; H04L 29/08
See application file for complete search history.

(56) References Cited

U.S. PATENT DOCUMENTS

| | | | | |
|---|---|---|---|---|
| 9,473,984 | B2* | 10/2016 | Xu | H04W 28/12 |
| 10,028,170 | B2* | 7/2018 | Lee | H04L 69/28 |
| 10,291,541 | B1* | 5/2019 | Sung | H04L 1/1877 |
| 2008/0205308 | A1* | 8/2008 | Prehofer | H04L 12/14 |
| | | | | 370/310 |
| 2009/0116426 | A1* | 5/2009 | Ho | H04L 47/28 |
| | | | | 370/328 |
| 2010/0034187 | A1* | 2/2010 | Kumar | H04W 28/06 |
| | | | | 370/345 |
| 2010/0316021 | A1* | 12/2010 | Lerzer | H04W 88/06 |
| | | | | 370/328 |
| 2011/0058475 | A1 | 3/2011 | Nilsson et al. | |
| 2011/0286468 | A1 | 11/2011 | Tomonaga et al. | |
| 2014/0098778 | A1 | 4/2014 | Valentin et al. | |
| 2016/0164793 | A1* | 6/2016 | Basu Mallick | H04L 47/32 |
| | | | | 370/235 |
| 2019/0090229 | A1 | 3/2019 | Iwai et al. | |

FOREIGN PATENT DOCUMENTS

| | | |
|---|---|---|
| JP | 2008-187461 A | 8/2008 |
| JP | 2011-504010 A | 1/2011 |
| JP | 2012-235493 A | 11/2012 |
| JP | 2014-522145 A | 8/2014 |
| JP | 2014-160911 A | 9/2014 |
| WO | 2010/089886 A | 8/2010 |
| WO | 2017/169061 A1 | 10/2017 |

OTHER PUBLICATIONS

Japanese Office Action for JP Application No. 2019-552725 dated Jun. 22, 2021 with english Translation.
Japanese Office Action for JP Application No. 2021-119445 dated Jul. 5, 2022 with English Translation.

* cited by examiner

CONTROL DEVICE, CONTROL METHOD, AND NON-TRANSITORY COMPUTER READABLE MEDIUM STORING PROGRAM

This application is a National Stage Entry of PCT/JP2018/040043 filed on Oct. 29, 2018, which claims priority from Japanese Patent Application 2017-217495 filed on Nov. 10, 2017, the contents of all of which are incorporated herein by reference, in their entirety.

TECHNICAL FIELD

The present disclosure relates a control device, a control method, and a program.

BACKGROUND ART

Currently, providing of ultra-low latency services via a mobile network is being considered. The ultra-slow latency services may include, for example, a self-driving service that transmits vehicle-mounted sensor information, traffic camera information, and map information etc. via a mobile network.

A mobile carrier (or a mobile operator) needs to guarantee an SLA (Service Level Agreement) in order to provide the ultra-low latency services to a user. The SLA may, for example, stipulate the delay time etc. to be guaranteed in the ultra-low latency service.

For example, Patent Literature 1 discloses that in order to maintain satisfactory service quality, a radio resource is efficiently allocated to a UE (User Equipment). Specifically, it discloses that allocation of the radio resource is optimized taking into account the information related to the restriction in the delay of applications etc. In other words, Patent Literature 1 discloses that service quality is maintained in a satisfactory state by optimizing the allocation of the radio resource so as not to have a base station exceed a permissible delay time in providing an application service.

Further, Patent Literature 2 discloses processing of a packet buffer device discarding a packet that has arrived. Specifically, Patent Literature 2 discloses that time during which the arrived packet is stagnant within a queue is estimated, and when the estimated time exceeds a threshold value, the arrived packet is discarded without being stored in the queue.

Further, Patent Literature 3 discloses that when the standby time indicating the time taken from the reception of a packet to the transmission thereof exceeds the maximum standby time, the packet is discarded. Further, Patent Literature 4 discloses that the packet that is kept under the standby state in the queue is discarded when the standby time exceeds the packet survival time.

CITATION LIST

Patent Literature

Patent Literature 1: Published Japanese Translation of PCT International Publication for Patent Application, No. 2014-522145

Patent Literature 2: International Patent Publication No. WO 2010/089886

Patent Literature 3: Japanese Unexamined Patent Application Publication No. 2000-286893

Patent Literature 4: Japanese Unexamined Patent Application Publication No. H11-289351

SUMMARY OF INVENTION

Technical Problem

However, Patent Literature 1 does not disclose the processing performed by the base station when the amount of data to be transmitted becomes large and a packet that exceeds the permissible delay time when providing the application service is generated. Therefore, the base station of Patent Literature 1 allocates a radio resource to the packet that exceeds the permissible delay time when providing the application service. As a result, there is a possibility that a problem of the radio resource that is allocated to the packet for which the permissible delay time has not been exceeded becoming insufficient may arise.

Further, Patent Literatures 2 to 4 disclose that when the resident time etc. exceeds a predetermined value for each packet, the packet that is to arrive or the packet within the queue is discarded. Therefore, when many packets exceeding the resident time etc. are present, it is necessary to decide, for each packet, whether or not the packet needs to be discarded, and thus the processing load of the device increases.

An object of the present disclosure is to provide a control device that can prevent an increase in a processing load and that can effectively allocate a radio resource, a control method, and a program.

Solution to Problem

A control device according to a first example aspect includes:

a deciding unit configured to decide whether or not an interval between generation of a first flow that is generated when performing radio communication between a communication terminal and a base station and generation of a second flow that is generated after the generation of the first flow exceeds a permissible delay time of the first flow; and a determination unit configured to determine deletion of non-transmitted data related to the communication terminal after lapse of the permissible delay time of the first flow when it is decided that the generation interval exceeds the permissible delay time of the first flow.

A control method according to a second example aspect includes:

deciding whether or not an interval between generation of a first flow that is generated when performing radio communication between a communication terminal and a base station and generation of a second flow that is generated after the generation of the first flow exceeds a permissible delay time of the first flow; and determining to delete non-transmitted data related to the communication terminal after lapse of the permissible delay time of the first flow when it is decided that the generation interval exceeds the permissible delay time of the first flow.

A program according to a third aspect causes a computer to execute:

deciding of whether or not an interval between generation of a first flow that is generated when performing radio communication between a communication terminal and a base station and generation of a second flow that is generated after the generation of the first flow exceeds a permissible delay time of the first flow; and determination of deleting non-transmitted data related to the communication terminal after lapse of the permissible delay time of the first flow when it is decided that the generation interval exceeds the permissible delay time of the first flow.

Advantageous Effects of Invention

According to the present disclosure, a control device that can prevent an increase in a processing load and that can effectively allocate a radio resource, a control method, and a program are provided.

DESCRIPTION OF EMBODIMENTS

First Example Embodiment

Figure 1:
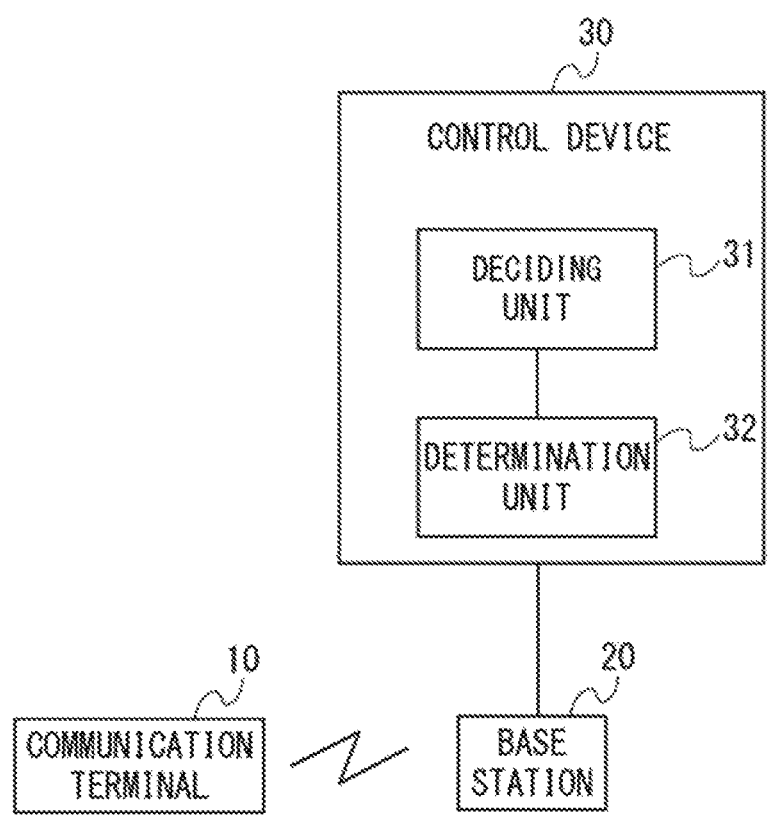
FIG. 1 is a structural diagram of a communication system according to a first example embodiment.

Hereinbelow, an example embodiment according to the present disclosure is explained with reference to the drawings. A structural example of a communication system according to a first example embodiment is explained using FIG. 1. The communication system shown in FIG. 1 includes a communication terminal 10, a base station 20, and a control device 30. The communication terminal 10, the base station 20, and the control device 30 may be computer devices, the processing of which is performed by causing a processor to execute a program stored in a memory.

The communication terminal 10 may be a mobile phone terminal, a smart phone terminal, or a tablet terminal. Further, the communication terminal 10 may be an IoT (Internet of Things) terminal, a M2M (Machine to Machine) terminal, or an MTC (Machine Type Communication) terminal. The communication terminal 10 may be a UE (User Equipment) that is used as a general term for a communication terminal in 3GPP (3rd Generation Partnership Project).

The base station 20 performs radio communication with the communication terminal 10. The base station 20 may be an eNB (an evolved Node B) defined as a base station that supports the radio communication standard LTE (Long Term Evolution) in the 3GPP. Alternatively, the base station 20 may be Node B that supports the radio communication standard corresponding to so-called 2G or 3G.

The control device 30 may be a server device that controls processing related to the radio communication between the communication terminal 10 and the base station 20. For example, the control device 30 may be an MEC (Mobile Edge Computing) server. The MEC server may be disposed at a position where it can perform directly communication with the base station. The position where direct communication is possible is a position where it is possible to perform communication without using a core network managed by a mobile carrier. For example, the MEC server may be physically integrated with the base station. Alternatively, the MEC server may be disposed at the same building as the base station and connected to an LAN (Local Area Network) within the building so that it can perform communication with the base station. A transmission delay time between the MEC server and a radio terminal can be shortened by locating the MEC server in a vicinity of the base station. The MEC server is used, for example, for providing ultra-low latency application services.

Next, a structural example of the control device 30 is explained. The control device 30 includes a deciding unit 31 and a determination unit 32. The deciding unit 31 and the determination unit 32 may each be a software or a module, the processing of which is executed by causing a processor to execute a program stored in a memory. Further, the deciding unit 31 and the determination unit 32 may be a hardware such as a chip or a circuit etc.

The deciding unit 31 decides whether or not an interval between generation of a first flow that is generated when the communication terminal 10 and the base station 20 perform radio communication and generation of a second flow that is generated after the generation of the first flow exceeds a permissible delay time of the first flow.

The flow that is generated when performing the radio communication includes, for example, one or a plurality of data transmitted in the application service provided to the communication terminal 10. Further, the data included in the flow may be referred to as data packets. The flow related to the communication terminal 10 may be a flow of transmission from the communication terminal 10 to the base station 20 or a flow of transmission from the base station 20 to the communication terminal 10. Alternatively, the flow that is generated when performing the radio communication may include, for example, a flow of transmission from the communication terminal 10 to the base station 20 and a flow of transmission from the base station 20 to the communication terminal 10. Data included in the flow of transmission from the communication terminal 10 to the base station 20 is collectively referred to as UL (Uplink) data. Further, data included in the flow of transmission from the base station 20 to the communication terminal 10 is collectively referred to as DL (Downlink) data. Data transmitted in the application service (for example, application data) may be, for example, image data or motion image data. Further, the application data may include a request message that requests transmission of image data etc., a response message that responds to the request message, and the like.

An interval between generations of the flows may be from when the data included in the flow of data that should be transmitted is stored in a buffer in the communication terminal 10 or the base station 20 until when the data included in a next flow of data that should be transmitted is stored in the buffer. Alternatively, the interval between generations of the flows may be time from creation of the data included in a flow of data that should be transmitted by the application until creation of data that is included in the next flow of data to be transmitted.

The deciding unit 31 may calculate the interval between generations of the flows by subtracting the time of generation of the first flow from the time of generation of the second flow. Alternatively, the deciding unit 31 may start a timer when the first flow is generated and stop the timer when the second flow is generated and specify the period during which the timer is activated as the interval between generations of flows. Alternatively, when the application has predetermined the interval between generations of the flows in advance, the deciding unit 31 may acquire information related to the interval between generations of the flows from the application.

The permissible delay time means a period during which transmission of a plurality of data packets included in one flow should be completed. The permissible delay time is requested by the application. The permissible delay time may also be referred to as transmission time limit. Alternatively, the permissible delay time can be referred to as the maximum transmission delay time permitted by the application. The permissible delay time can be defined variously. For example, the permissible delay time may indicate completion deadline of transmission by a sender of an application layer. Alternatively, the permissible delay time may indicate completion deadline of transmission by a sender of a radio layer. Alternatively, the permissible delay time may indicate completion deadline of reception by a receiver of the application layer. Alternatively, the permissible delay time may indicate completion deadline of reception by a receiver of the radio layer. Alternatively, to be more specific, the permissible delay time may indicate the deadline from the start of transmission of a first data packet related to one flow by the sender of the application layer to the completion of reception of a last data packet related to one flow by the receiver of the application layer. Alternatively, the permissible delay time may indicate the deadline from the start of transmission of a first data packet related to one flow by the sender of the radio layer to the completion of reception of a last data packet related to one flow by the receiver of the radio layer.

Further, the permissible delay time may also be referred to as a transmission deadline or simply as a deadline.

The deciding unit 31 may receive information relate to the permissible delay time from the application included in the control device 30.

The determination unit 32 determines to delete the non-transmitted data related to the communication terminal 10 when it is decided in the deciding unit 31 that the interval between generations of the first flow and the second flow generated after the first flow exceeds the permissible delay time of the first flow. The non-transmitted data may be, for example, data related to the communication terminal 10 which has not been transmitted after lapse of the first permissible delay time. The non-transmitted data related to the communication terminal 10 may be the UL data transmitted from the communication terminal 10 to the base station 20, and may be the DL data transmitted from the base station 20 to the communication terminal 10.

As described above, the control device 30 can perform the processing mentioned below when the interval between generations of the flows that are generated when performing radio communication exceeds the permissible delay time of the first flow, which is a flow generated first. The control device 30 can determine to delete the non-transmitted data related to the communication terminal 10 after lapse of the permissible delay time of the first flow.

When the interval between generations of the flows exceeds the permissible delay time of the first flow, the second flow is not included in the non-transmitted data related to the communication terminal 10 after lapse of the permissible delay time of the first flow and before the generation of the second flow. Therefore, even if the non-transmitted data related to the communication terminal 10 after lapse of the permissible delay time of the first flow is deleted, only the data included in the first flow is deleted.

Since the permissible delay time of the first flow has already lapsed, the communication terminal 10 or the base station 20 discards the received data even if the communication terminal 10 or the base station 20 receives the data relates to the first flow. The control device 30 can determine to delete the non-transmitted data of the communication terminal 10 or the base station 20 before a radio resource is allocated to the data related to the first flow for which the permissible delay time has already lapsed.

As a result, it is possible to prevent the radio resource from being allocated to the data related to the first flow for which the permissible delay time has already lapsed between the communication terminal 10 and the base station 20.

Further, the deciding unit 31 does not perform the deciding processing for each packet but can perform the deciding processing for each flow that includes a plurality of data or packets. In other words, the determination unit 32 does not determine whether or not to discard data for each packet but determines whether or not to collectively discard a plurality of data or packets included in the flow. Therefore, a processing load in the deciding unit 31 can be reduced when the deciding processing is performed for each packet.

Further, in the first example embodiment, a configuration in which the control device 30 is a device different from the communication terminal 10 and the base station 20 has been explained. However, the communication device 10 and the base station 20 may include the control device 30. In other words, the communication terminal 10 and the base station 20 may include the deciding unit 31 and the determination unit 32 which are included in the control device 30.

Second Example Embodiment

Figure 2:
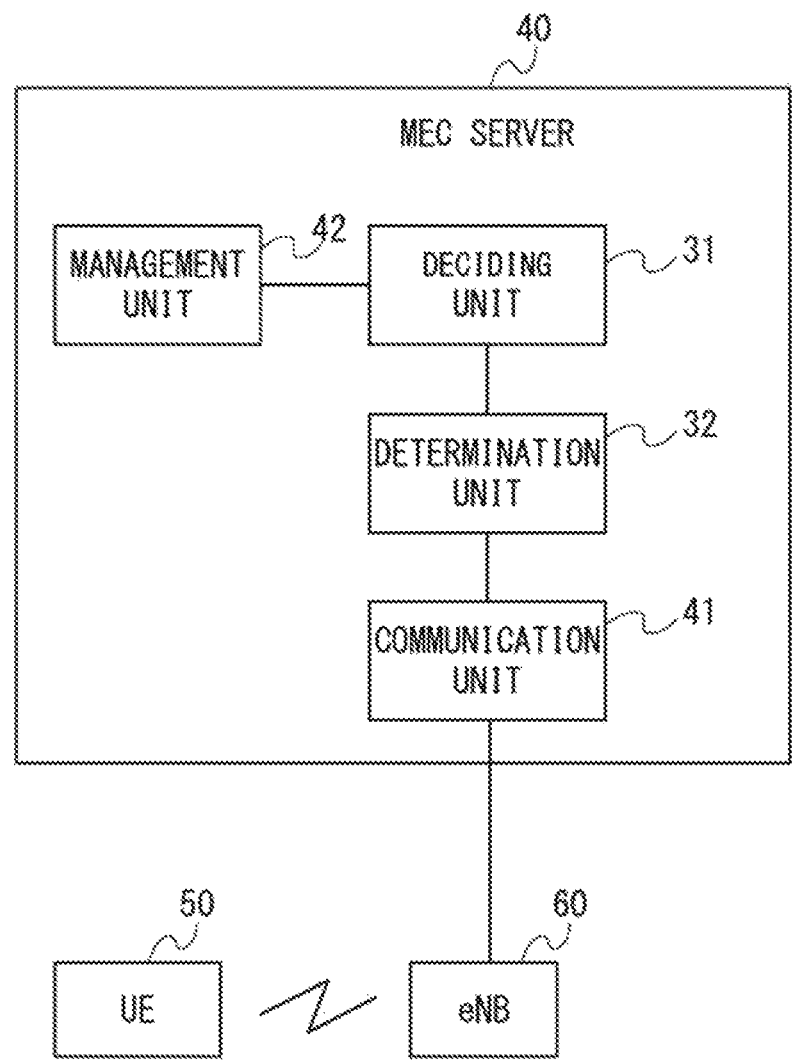
FIG. 2 is a structural diagram of an MEC (Mobile Edge Computing) server according to a second example embodiment.

Next, a structural example of an MEC server 40 according to a second example embodiment is explained using FIG. 2. The MEC server 40 corresponds to the control device 30 shown in FIG. 1. The MEC server 40 has a configuration in which a communication unit 41 and a management unit 42 are added to the control device 30 shown in FIG. 1. Detailed explanations of the function and the operation of the deciding unit 31 and the determination unit 32 that are the same as those of FIG. 1 are omitted. The communication unit 41 and the management unit 42 may each be a software or a module, the processing of which is executed by causing a processor to execute a program stored in a memory. Further, the communication unit 41 and the management unit 42 may be a hardware such as a chip or a circuit etc.

Further, in the following explanation, the communication terminal 10 shown in FIG. 1 is explained as a UE 50. Further, the base station 20 shown in FIG. 1 is explained as an eNB 60.

The management unit 42 manages information related to the permissible delay time of a flow that is generated when the UE 50 and the eNB 60 perform radio communication. The management unit 42 may manage information related to permissible delay input by an administrator etc. of the MEC server 40, and may manage information related to the permissible delay received from application server etc. The information related to the permissible delay may, for example, be associated with the application service provided to the UE. In other words, the information related to the permissible delay may be defined for each application. Alternatively, the information related to the permissible delay may be defined for each UE.

The deciding unit 31 measures an interval between generations of the flows. For example, the deciding unit 31 may receive a message indicating that a flow is generated from the UE 50 or the eNB 60. The deciding unit 31 may specify the interval between generations of the flows by measuring an interval between messages. The message indicating generation of a flow may be, for example, a message or U(User)-Plane data in an application layer or may be a control message or C(Control)-Plane data. The U-Plane data is data referred to as user data in the mobile network and C-Plane data is data referred to as control information.

Alternatively, the deciding unit 31 may acquire information related to the interval between generations of the flows from the application when the interval between generations of the flows is determined in advance in the application within the MEC server 40 or the application within the application server. The information related to the interval between generations of the flows determined in advance in the application may be managed by the management unit 42.

The communication unit 41 transmits a message to the UE 50 and the eNB 60 when the permissible delay time of the first flow generated by radio communication between the UE 50 and the eNB 60 is exceeded in the determination unit 32. For example, the communication unit 41 transmits a discard message including identification information of the UE 50 to the eNB 60 when it is determined that the non-transmitted data related to the UE 50 is to be deleted. Further, the eNB 60 transmits, to the UE 50, a discard message including the identification information of the UE 50. That is, the MEC server 40 transmits the discard message including the identification information of the UE 50 to the UE 50 via the eNB 60.

Further, the communication unit 41 transmits the discard message to the eNB 60 when it is determined that the non-transmitted data related to the UE 50 is to be deleted. The discard message includes information indicating that the non-transmitted data to the UE 50 is the object of deletion. Further, the communication unit 41 transmits the discard message to the UE 50 via the eNB 60. The discard message includes information indicating that the non-transmitted data to the eNB 60 is the object of deletion.

Further, the deciding unit 31 or the determination unit 32 may manage the states of the buffers in the UE 50 and the eNB 60. For example, the deciding unit 31 and the determination unit 32 may receive information related to the states of the buffers from the UE 50 and the eNB 60 via the communication unit 41 periodically or irregularly. The state of the buffer may be, for example, whether or not the non-transmitted data is present within the buffer, or the amount of non-transmitted data present within the buffer. Further, the determination unit 32 may transmit a message indicating that the data within the buffer is cleared to the UE 50 or the eNB 60 when it is decided that the non-transmitted data is present within the buffer of the UE 50 or the eNB 60 after lapse of the permissible delay time. The determination unit 32 may transmit a message instructing to clear the data within the buffer to the UE 50 or the eNB 60 via the communication unit 41.

Figure 3:
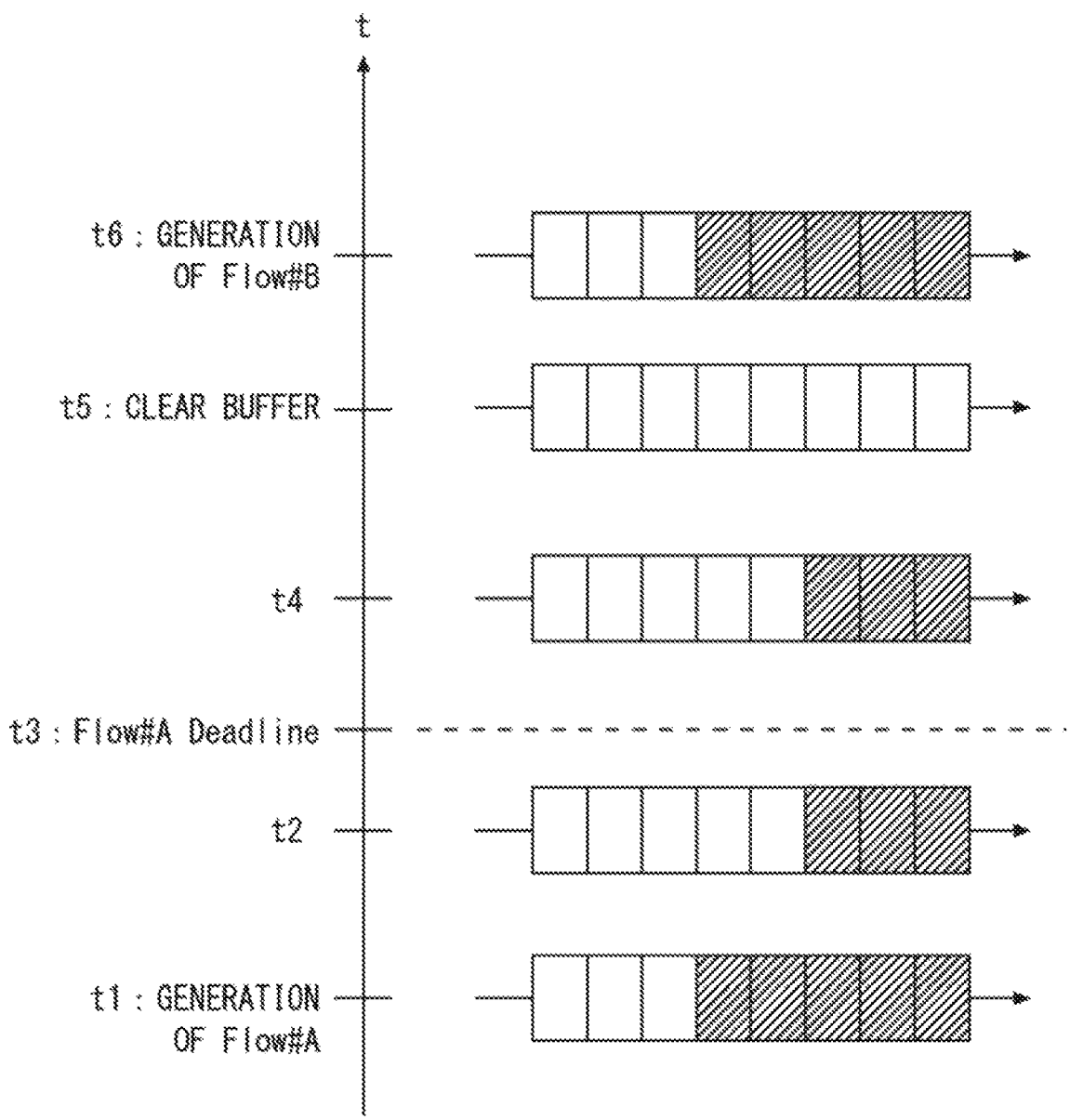
FIG. 3 is diagram showing an outline of processing by a UE that has received a discard message according to the second example embodiment.

Next, an outline of the processing performed in the UE 50 that has received the discard message is explained using FIG. 3. FIG. 3 shows data stored in the buffer at times t1 to t6. Note that herein, the outline of the processing performed in the UE 50 is explained using FIG. 3, and the same processing as that shown in FIG. 3 is performed in the eNB 60.

At the time t1, Flow #A transmitted from the UE 50 to the eNB 60 is generated. In FIG. 3, it is indicated that the transmission data is stored in the buffer at the time t1. A shaded area shown in FIG. 3 indicates the transmission data. The transmission data is data included in Flow #A.

Next, at the time t2, the data is transmitted from the UE 50 to the eNB 60 whereby the data stored in the buffer is reduced compared to that at the time t1.

Next, the time t3 indicates the permissible delay time (deadline) of Flow #A. The time t4 is a time after lapse of the permissible delay time of Flow #A and indicates that the non-transmitted data is still present within the buffer after lapse of the permissible delay time of Flow #A.

Here, it is assumed that the UE 50 receives a discard message from the MEC server 40 via the eNB 60. Therefore, at the time t5, the UE 50 clears or deletes the non-transmitted data still present within the buffer after lapse of the permissible delay time. In FIG. 3, it is indicated that since the data within the buffer of the UE 50 is cleared at the time t5, the non-transmitted data related to Flow #A is not present within the buffer. The time t5 is a timing after lapse of the permissible delay time of Flow #A and before generation of Flow #B.

Next, at the time t6, Flow #B transmitted from the UE 50 to the eNB 60 is generated. In FIG. 3, it is indicated that the transmission data is stored in the buffer at the time t6.

The interval between generation of Flow #A and Flow #B exceeds the permissible delay time of Flow #A. Therefore, the non-transmitted data still present within the buffer at the time t4 is the data related to Flow #A and does not include the data related to Flow #B. Therefore, the UE 50 can delete only the data related to Flow #A at the time t5.

Figure 4:
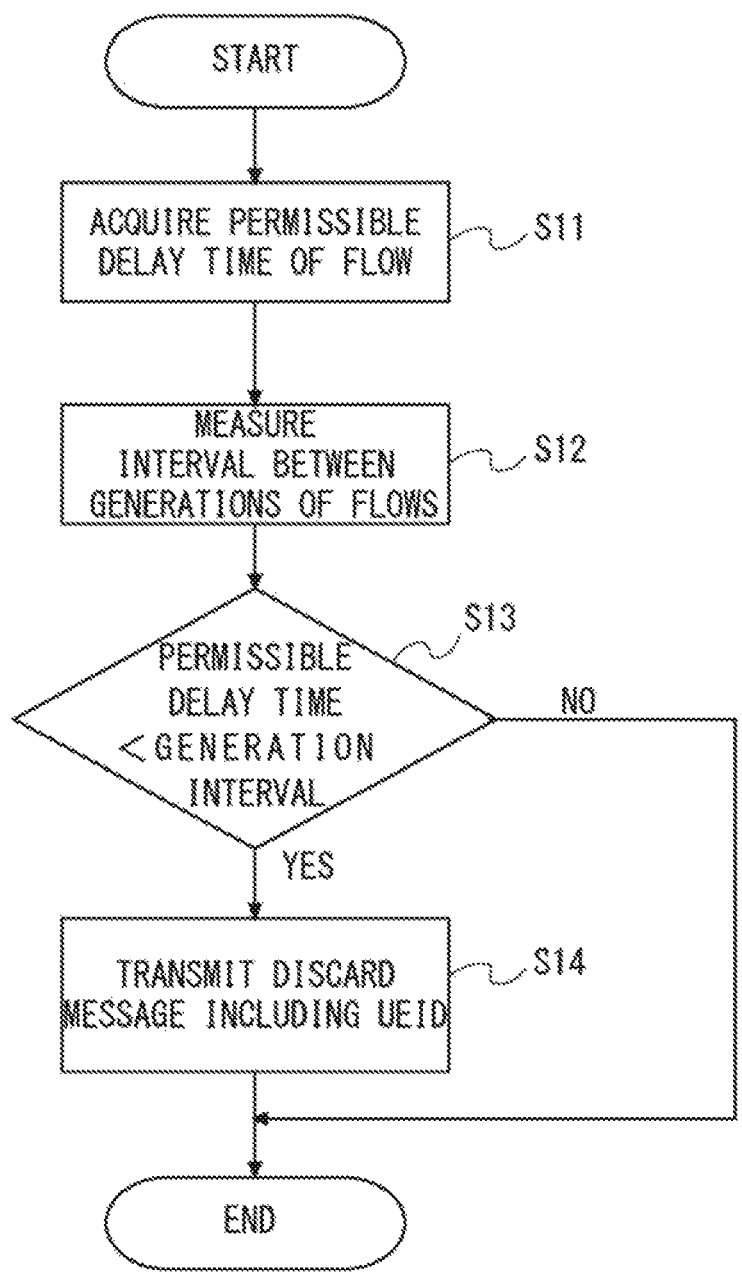
FIG. 4 is a diagram showing a flow of transmission processing of a discard message in an MEC server according to the second example embodiment.

Next, a flow of transmission processing of the discard message in the MEC server 40 according to the second example embodiment is explained using FIG. 4. First, the deciding unit 31 obtains the permissible delay time of the flow of data from the management unit 42 (Step S11). The flow is, for example, a flow that is generated when the UE 50 and the eNB 60 perform radio communication. For example, in Step S11, the permissible delay time related to the flow of transmission from the UE 50 to the eNB 60 is obtained. Each time a flow is generated, the deciding unit 31 may obtain the permissible delay time related to the flow. Alternatively, when the permissible delay time of the flow related to a specific application is the same for all applications, the deciding unit 31 may obtain the permissible delay time related to the flow only at a timing at which the first flow is generated.

Next, the deciding unit 31 measures the interval between the generations of the flows of transmission from the UE 50 to the eNB 60 (Step S12). When the interval between generations of the flows is determined in advance, the deciding unit 31 acquires information related to the interval between generations of the flows determined in advance from the application in the UE 50 or the application in the application server. The application server may be a device different from the UE 50.

Next, the deciding unit 31 decides whether or not the interval between generations of the flows related to the UE 50 has exceeded the permissible delay time (Step S13). When the deciding unit 31 decides that the interval between generations of the flows related to the UE 50 exceeds the permissible delay time, the determination unit 32 determines to delete the non-transmitted data after lapse of the permissible delay time of the flow that is generated in the UE 50. Further, the communication unit 41 transmits the discard message including the identification information of the UE 50 to the UE 50 via the eNB 60 (Step S14).

In Step S13, when the deciding unit 31 decides that the interval between generations of the flows related to the UE 50 has not exceeded the permissible delay time, the processing ends.

Figure 5:
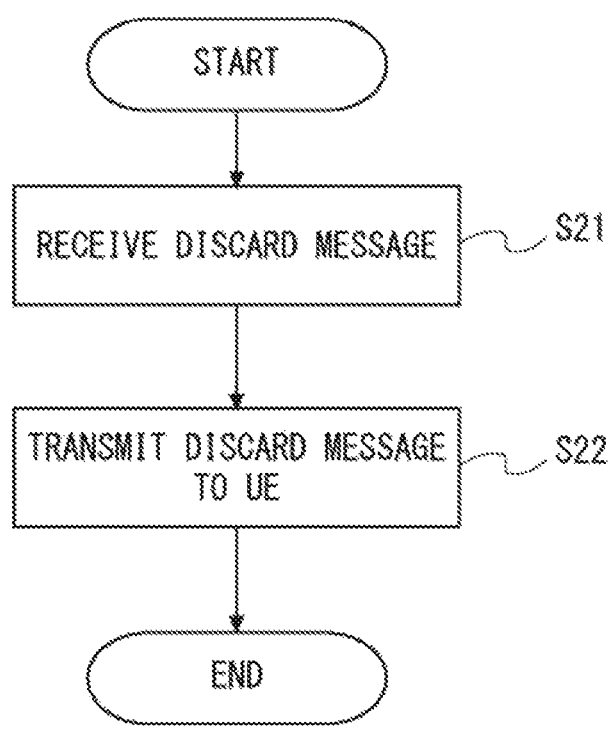
FIG. 5 is a diagram showing a flow of processing when eNB receives a discard message from the MEC server according to the second example embodiment.

Next, a flow of processing when the eNB 60 according to the second example embodiment receives a discard message from the MEC server 40 is explained using FIG. 5. Firstly, the eNB 60 receives the discard message transmitted from the MEC server 40 (Step S21). It is assumed that the identification information of the UE 50 is included in the discard message received by the eNB 60.

Next, the eNB 60 transmits the discard message received from the MEC server 40 to the UE 50 (Step S22). The eNB 60 transmits the discard message to the UE indicated by the identification message included in the discard message received from the MEC server 40.

Figure 6:
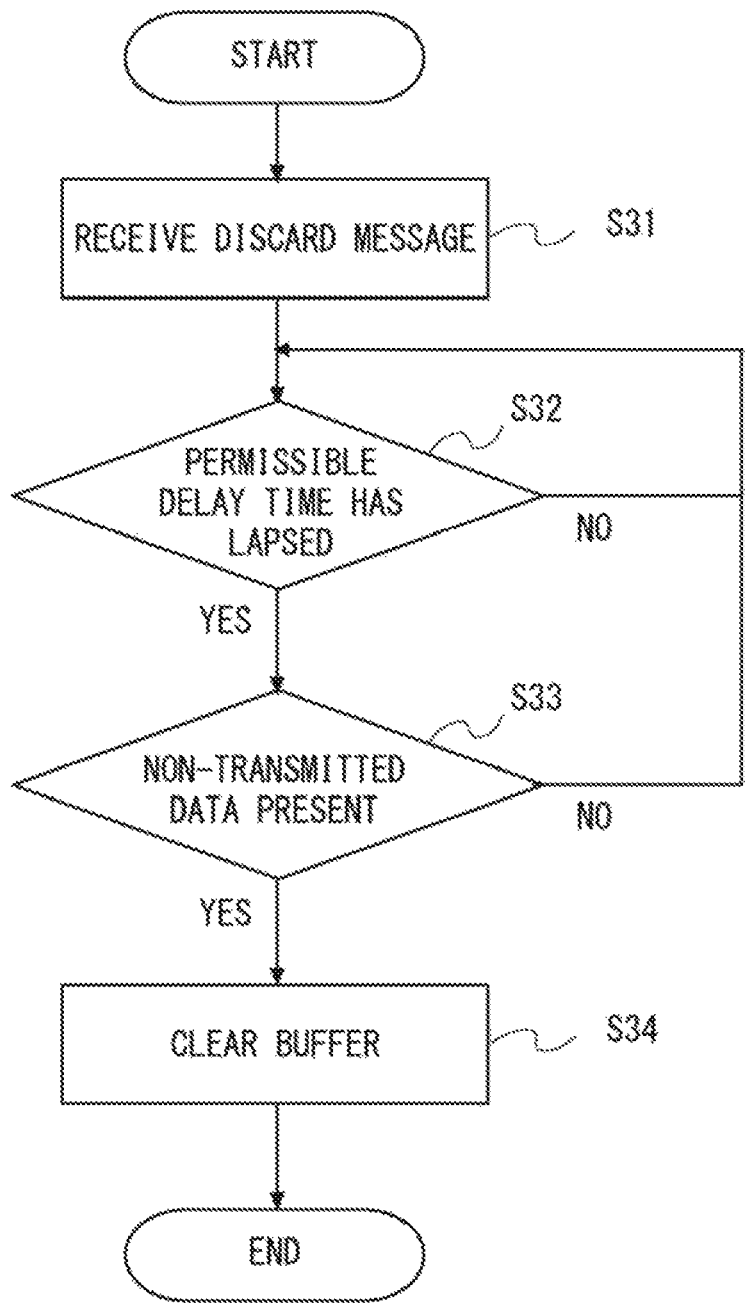
FIG. 6 is a diagram showing a flow of data processing performed in the UE according to the second example embodiment.

Next, the flow of data processing performed in the UE 50 according to the second example embodiment is explained using FIG. 6. First, the UE 50 receives the discard message transmitted from the eNB 60 (S31).

Next, the UE 50 decides whether or not the permissible delay time of the target flow has lapsed in the discard message (Step S32). The target flow in the discard message is the flow including the data which is to be transmitted to the eNB 60 by the UE 50.

The permissible delay time of the flow may be, for example, notified to the UE 50 in advance based on the SLA. For example, the UE 50 may acquire information related to the permissible delay time from the MEC server 40 or the application server etc. in advance prior to getting a service related to the target flow in the discard message. Alternatively, the discard message received from the MEC server 40 via the eNB 60 may include the information related to the permissible delay time of the flow.

The UE 50 decides whether or not the non-transmitted data is present within the buffer when it decides that the permissible delay time of the target flow in the discard message has lapsed (Step S33). The UE 50 clears the data within the buffer when it decides that the non-transmitted data is present within the buffer (Step S34). In other words, the UE 50 discards or deletes all of the data within the buffer when it decides that the non-transmitted data is present within the buffer.

When it is decided that the permissible delay time has not lapsed in Step S32 and when it is decided that the non-transmitted data is not present in Step S33, the UE 50 repeats the processing subsequent to Step 32.

Further, the flow of data processing performed in UE 50 has been explained using FIG. 6, and the same data processing is performed in eNB 60. The eNB 60 can recognize that the target flow in the discard message is the flow including the data which is transmitted to the UE 50 since the discard message includes the identification information of the UE 50. Therefore, in the eNB 60 as well, by performing the processing in Steps S31 to S34 of FIG. 6, the non-transmitted data within the buffer related to the UE 50 can be cleared.

Further, the eNB 60 can perform radio communication with a plurality of UEs. Therefore, the eNB 60 uses a different butter for each UE. Accordingly, the eNB 60 specifies which UE's buffer to delete non-transmitted data included in after the Step S31 shown in FIG. 6.

As described above, the MEC server 40 according to the second example embodiment can determine to delete the non-transmitted data after lapse of the permissible delay time of the flow related to the UE 50 when the interval between generations of the flows in the UE 50 exceeds the permissible delay time. As a result, it is possible to prevent allocation of a radio resource to the non-transmitted data after lapse of the permissible delay time of the flow.

Further, it is possible to prevent coresidence of the data for which the permissible delay time of the flow has not been exceeded and the data for which the permissible delay time of the flow has been exceeded within the buffer by targeting the flow whose generation interval has exceeded the permissible delay time. As a result, it is possible to clear only the data for which the permissible delay time of the flow has been exceeded when the non-transmitted data within the buffer is cleared. By this configuration, it is possible to prevent lowering of the data arrival rate by discarding the data for which the permissible delay time of the flow has not been exceeded.

Further, in the aforementioned explanation, the processing of deleting the non-transmitted data within the buffer after lapse of the permissible delay time by the UE 50 and the eNB 60 has been explained. However, the UE 50 and the eNB 60 may delete the non-transmitted data within the buffer before the permissible delay time. The UE 50 and the eNB 60 delete the non-transmitted data present within the buffer prior to the permissible delay time by a prescribed time. As a result, the UE 50 and the eNB 60 may delete the data that could, in the future, become non-transmitted data after lapse of the permissible delay time. Further, the UE 50 and the eNB 60 may delete the non-transmitted data that is present within the buffer when the non-transmitted data present within the buffer exceeds the threshold value of the predetermined data amount prior to the permissible delay time by a prescribed time.

Third Example Embodiment

Figure 7:
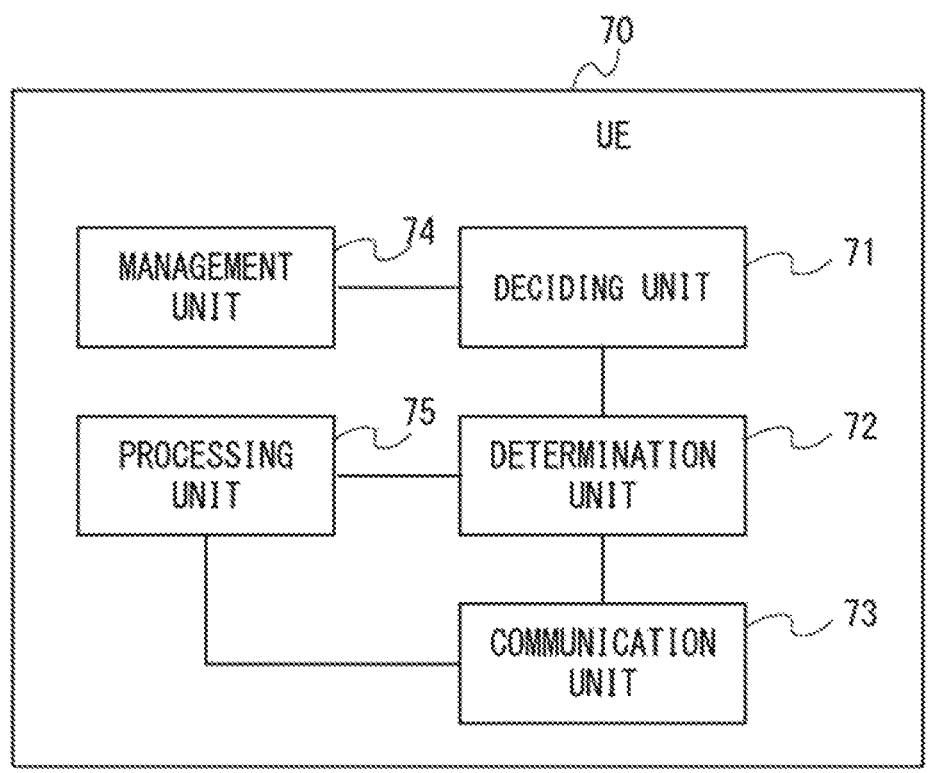
FIG. 7 is a structural diagram of the UE according to a third example embodiment.

Next, a structural example of a UE 70 according to a third example embodiment is explained using FIG. 7. In the second example embodiment, an example of determining the target UE in which the non-transmitted data after lapse of the permissible delay time of the flow is deleted by the MEC server 40 has been explained. In the third example embodiment, the UE 70 determines whether or not the UE 70 itself is the UE for which the non-transmitted data after lapse of the permissible delay time of the flow is the target of deletion.

The UE 70 includes a deciding unit 71, a determination unit 72, a communication unit 73, a management unit 74, and a processing unit 75. The deciding unit 71, the determination unit 72, and the management unit 74 are the same as the deciding unit 31, the determination unit 32, and the management unit 42 of the MEC server 40 in FIG. 2, and thus detailed explanations thereof are omitted.

In FIG. 7, the deciding unit 71 decides whether or not the interval between generations of the flows that are generated when performing radio communication with the eNB 60 exceeds the permissible delay time of the flow. There is a case where the interval between generations of the flows that are generated when performing radio communication with the eNB 60 exceeds the permissible delay time of the flow. In this case, the determination unit 72 determines to delete the non-transmitted data which has not been transmitted to the eNB 60 after lapse of the permissible delay time.

The communication unit 73 transmits a discard message to the eNB 60 when it is determined in the determination unit 72 that non-transmitted data after lapse of the permissible delay time is to be discarded. The discard message includes identification information of the UE 70. The discard message is used to instruct or request the eNB 60 to discard the non-transmitted data for the flow related to the UE 70 when the non-transmitted data is present after lapse of the permissible delay time.

Further, the communication unit 73 allocates a radio resource to the data stored within the buffer of the UE 70 and transmits the data to the eNB 60. The buffer within the UE 70 may, for example, include the processing unit 75.

The processing unit 75 discards the non-transmitted data within the buffer after lapse of the permissible delay time when it is determined in the determination unit 72 that the non-transmitted data after lapse of the permissible delay time is to be discarded.

When the eNB 60 receives the discard message from the UE 70, it clears the non-transmitted data within the buffer related to the UE 70.

Further, in the third example embodiment, it has been explained that the UE 70 determines whether or not the UE 70 itself is the UE for which the non-transmitted data after lapse of the permissible delay time is the target of deletion. Alternatively, the eNB 60 may determine the UE for which the non-transmitted data after lapse of the permissible delay time of the flow is the target of deletion. The eNB 60 transmits the discard message to the UE 70 when it determines to discard the non-transmitted data after lapse of the permissible delay time of the flow related to the UE 70. Further, the UE 70 follows the discard message and discards the non-transmitted data after lapse of the permissible delay time of the flow.

As described above, the UE 70 according to the third example embodiment can determine whether or not to discard the non-transmitted data after lapse of the permissible delay time of the flow. Accordingly, the MEC server 40 does not need to transmit the discard message to the UE 70 via the eNB 60. Therefore, it is possible to reduce the processing load of the MEC server 40 and further, to prevent allocation of the radio resource for transmitting the discard message.

Further, when the eNB 60 determines whether or not the non-transmitted data after lapse of the permissible delay time of the flow is to be discarded, it is also possible to reduce the processing load of the MEC server 40.

Fourth Example Embodiment

Next, an example of an operation of the MEC server 40 according to a fourth example embodiment is explained. In the fourth example embodiment, an operation of the MEC server 40 when the data for which the permissible delay time of the flow has been exceeded and the data for which the permissible delay time of the flow has not been exceeded are coresident in a buffer included in the UE 50 or the eNB 60 is explained.

For example, there may be a case where the non-transmitted data of the flow related to the UE 50 was not the target of deletion, but at a later stage, the non-transmitted data of the flow related to the UE 50 became the target of deletion. In this case, the data for which the permissible delay time of the flow has been exceeded and the data for which the permissible delay time of the flow has not been exceeded may be coresident within the buffer.

Specifically, there is case where at least one of the permissible delay time and the interval between generations of the flows changes after it is decided that the non-transmitted data of the flow related to the UE 50 is not the target of deletion. In this case, the non-transmitted data of the flow related to the UE 50 may be re-decided as being the target of deletion.

Alternatively, when the MEC server 40 has a measurement period for measuring the flow generation interval set, the non-transmitted data of the flow related to the UE 50 is not the target of deletion in the measurement period, and the non-transmitted data of the flow related to the UE 50 becomes the target of deletion after lapse of the measurement period.

In view of the aforementioned circumstances, when the data for which the permissible delay time of the flow has been exceeded and the data for which the permissible delay time of the flow has not been exceeded are coresident in the buffer included in the UE 50 or the eNB 60, whether to clear the data within the buffer may be decided based on various criterions.

For example, the MEC server 40 may decide whether or not to clear the data within the buffer according to the data stored in the buffer included in the UE 50 or the eNB 60. Specifically, the MEC server 40 may clear the data within the buffer when the amount of data for which the permissible delay time of the flow has been exceeded exceeds the amount of data for which the permissible delay time of the flow has not been exceeded. Further, the MEC server 40 may clear the data within the buffer when the number of flows for which the permissible delay time has been exceeded exceeds the number of flows for which the permissible delay time has not been exceeded. Further, the MEC server 40 may not clear the data within the buffer when the amount of data for which the permissible delay time of the flow has been exceeded falls short of the amount of data for which the permissible delay time of the flow has not been exceeded. Further, the MEC server 40 may clear the data within the buffer when the number of flows for which the permissible delay time has been exceeded falls short of the number of flows for which the permissible delay time has not been exceeded.

Alternatively, the MEC server 40 may clear all of the data within the buffer when the data for which the permissible delay time of the flow has been exceeded and the data for which the permissible delay time of the flow has not been exceeded are coresident in the buffer in the UE 50 or the eNB 60. Alternatively, there is a case where the data for which the permissible delay time of the flow has been exceeded and the data for which the permissible delay time of the flow has not been exceeded are coresident in the buffer included in the UE 50 or the eNB 60. In this case, the MEC server 40 may not clear all of the data within the buffer.

As described above, it is possible to determine in advance how the data within the buffer is handled when the data for which the permissible delay time of the flow has been exceeded and the data for which the permissible delay time of the flow has not been exceeded are coresident within the buffer of the UE 50 or the eNB 60.

Further, in the fourth example embodiment, the operation of the MEC server 40 has been explained, however, the same operation may be performed by the UE 50 or the eNB 60.

Figure 8:
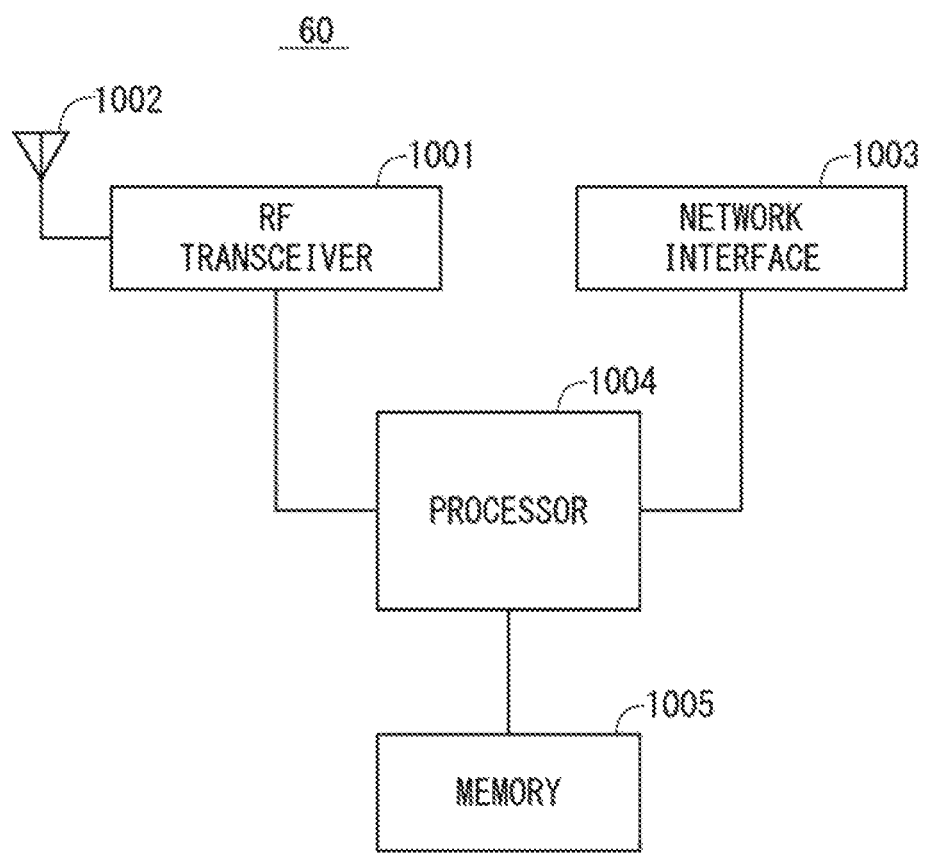
FIG. 8 is a structural diagram of the eNB according to each example embodiment.

Next, structural examples of the MEC server 40, the UE 50, the eNB 60, and the UE 70 explained in the plurality of aforementioned example embodiments are explained. FIG. 8 is a block diagram showing a structural example of the eNB 60. Referring to FIG. 8, the eNB 60 includes an RF transceiver 1001, a network interface 1003, a processor 1004, and a memory 1005. The RF transceiver 1001 performs analogue RF signal processing for communicating with the UEs. The RF transceiver 1001 may include a plurality of transceivers. The RF transceiver 1001 is coupled to an antenna 1002 and the processor 1004. The RF transceiver 1001 receives a modulation symbol data (or an OFDM symbol data) from the processor 1004, generates a transmission RF signal, and supplies the transmission RF signal to the antenna 1002. Further, the RF transceiver 1001 generates a baseband reception signal based on the reception signal RF received by the antenna 1002 and supplies the signal to the processor 1004.

The network interface 1003 is used for communicating with the network node (e.g., other core network node). The network interface 1003 may include, for example, a network interface card (NIC) pursuant to the IEEE 802.3 series.

The processor 1004 performs data plane processing and control plane processing including digital baseband signal processing for radio communication. For example, in the case of the LTE standard or the 5G standard, the digital baseband signal processing by the processor 1004 may include signal processing of an MAC layer and a PHY layer.

The processor 1004 may include a plurality of processors. For example, the processor 1004 may include a modem processor (e.g., DSP) that performs digital baseband signal processing and a protocol stack processor (e.g., CPU or MPU) that performs control plane processing.

The memory 1005 is configured by a combination of a volatile memory and a non-volatile memory. The memory 1005 may include a plurality of memory devices that are physically independent. The non-volatile memory is, for example, a Static Random Access Memory (SRAM), a Dynamic RAM (DRAM), or a combination thereof. The non-volatile memory is a Mask Read Only Memory (MROM), an Electrically Erasable Programmable ROM (EEPROM), a flash memory, or a hard disk drive, or a combination thereof. The memory 1005 may include a storage disposed at a distance from the processor 1004. In this case, the processor 1004 may access the memory 1005 via the network interface 1003 or the I/O interface (not shown).

The memory 1005 may store a software module (a computer program) including an instruction group and data for performing processing by the eNB 60 described in the aforementioned plurality of example embodiments. In some implementations, the processor 1004 may be configured so that the processing by the eNB 60 explained above is performed by reading out the software module from the memory 1005.

Figure 9:
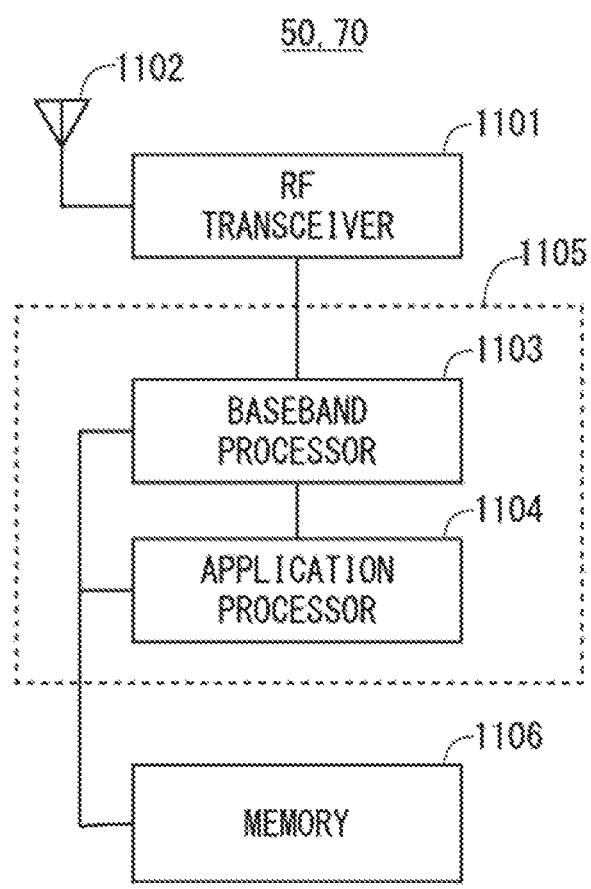
FIG. 9 is a structural diagram of the UE according to each example embodiment.

FIG. 9 is a block diagram showing a structural example of the UE 50 and the UE 70. A Radio Frequency (RF) transceiver 1101 performs analogue RF signal processing for performing communication with the eNB 60. The analogue RF signal processing performed by the RF transceiver 1101 includes frequency up-conversion, frequency down-conversion, amplification. The RF transceiver 1101 is coupled to an antenna 1102 and a baseband processor 1103. That is, the RF transceiver 1101 receives the modulation symbol data (or OFDM symbol data) from the baseband processor 1103, generates the transmission RF signal, and supplies the transmission RF signal to the antenna 1102. Further, the RF transceiver 1101 generates the baseband reception signal based on the RF signal received by the antenna 1102 and supplies the generated signal to the baseband processor 1103.

The baseband processor 1103 performs the digital baseband signal processing (the data plane processing) and the control plane processing. The digital baseband signal processing includes (a) data compression/recovery, (b) data segmentation/concatenation, (c) formation/decomposition of transmission format (data stream), (d) encoding/decoding of transmission path, (e) modulation (symbol mapping), and (f) generation of OFDM symbol data (the baseband OFDM signal) by the Inverse Fast Fourier Transform (IFFT) etc. On the other hand, the control plane processing includes communication management of a layer 1 (e.g., transmission power control), a layer 2 (e.g., a radio resource management and hybrid automatic repeat request (HARQ) processing), and a layer 3 (e.g., attach, mobility, and communication management related to signaling).

For example, in the case of the LTE standard and the 5G standard, the digital baseband signal processing by the baseband processor 1103 may include a Packet Data Convergence Protocol (PDCP) layer, a Radio Link Control (RLC) layer, a MAC layer, and a PHY layer. Further, the control plane processing by the baseband processor 1103 may include a Non-Access Stratum (NAS) protocol, an RRC protocol, and processing of MAC CE.

The baseband processor 1103 may include a modem processor (e.g., Digital Signal Processor (DSP)) that performs the digital baseband signal processing and a protocol stack processor (e.g., Central Processing Unit (CPU) or a Micro Processing Unit (MPU) that performs processing of control plane processing. In this case, the protocol stack processor that performs the control plane processing may be a common part as an application processor 1104 described later.

The application processor 1104 may also be referred to as a CPU, an MPU, a microprocessor, or a processor core. The application processor 1104 may include a plurality of processors (a plurality of processor cores). The application processor 1104 realizes various function of the UE 50 and the UE 70 by executing a system software program (Operating System (OS)) and various application programs (for example, a communication application, a WEB browser, a mailer, a camera operation application, a music playback application) read out from the memory 1106 and a memory (not shown).

In some implementations, as shown by the dotted lines (1105) in FIG. 9, the baseband processor 1103 and the application processor 1104 may be integrated on one chip. In other words, the baseband processor 1103 and the application processor 1104 may be mounted on one System on Chip (SoC) device 1105. The SoC device may also be referred to as a system Large Scale Integration (LSI) or a chip set.

The memory 1106 may be a volatile memory or a non-volatile memory, or a combination thereof. The memory 1106 may include a plurality of memory devices that are physically independent. The non-volatile memory is, for example, a Static Random Access Memory (SRAM), a Dynamic RAM (DRAM), or a combination thereof. The non-volatile memory is a Mask Read Only Memory (MROM), an Electrically Erasable Programmable ROM (EEPROM), a flash memory, or a hard disk drive, or a combination thereof. For example, the memory 1106 may include the baseband processor 1103, the application processor 1104, and an external memory device that is accessible from the SoC device 1105. The memory 1106 may include a built-in memory device integrated within the baseband processor 1103, the application processor 1104, or the SoC device 1105. Further, the memory 1106 may include a memory within a Universal Integrated Circuit Card (UICC).

The memory 1106 may store a software module (a computer program) including an instruction group and data for performing processing by the UE 50 and the UE 70 described in the aforementioned plurality of example embodiments. In some implementations, the processor 1103 and the application processor 1104 may be configured so that the processing by the UE 50 and the UE 70 explained in the aforementioned example embodiments are performed by reading out the software module from the memory 1106.

Figure 10:
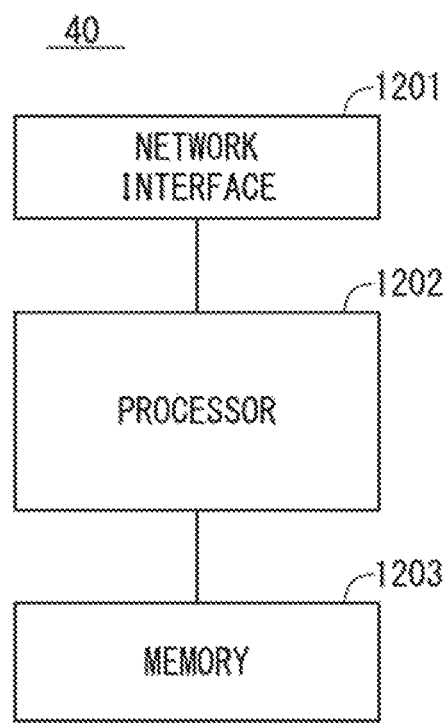
FIG. 10 is a structural diagram showing the MEC server according to each example embodiment.

FIG. 10 is a block diagram showing a structural example of the MEC server 40. Referring to FIG. 10, the MEC server 40 include a network interface 1201, a processor 1202, and a memory 1203. The network interface 1201 is used for communicating with another network node device that configures the communication system. The network interface 1201 may include, for example, a network interface card (NIC) pursuant to the IEEE 802.3 series.

The processor 1202 may be configured so that the processing by the MEC server 40 explained in the aforementioned example embodiments using sequence diagrams and flowcharts is performed by reading out the software (a computer program) from the memory 1203. The processor 1202 may be, for example a microprocessor, an MPU (Micro Processing Unit), or a CPU (Central Processing Unit). The processor 1202 may include a plurality of processors.

The memory 1203 is configured by a combination of a volatile memory and a non-volatile memory. The memory 1203 may include a storage disposed at a distance from the processor 1202. In this case, the processor 1202 may access the memory 1203 via the I/O interface (not shown).

In the example shown in FIG. 10, the memory 1203 is used to store a group of software group modules. The processor 1202 may be configured so that the processing by the MEC server 40 explained in the aforementioned example embodiments is performed by reading out the software modules from the memory 1203.

As explained using FIG. 10, each of the processors included in the MEC server 40 may be configured to execute one or a plurality or programs including an instruction group for casing a computer to execute the algorithms explained using the figures.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above embodiments, and can be naturally changed variously without departing from the gist of the disclosure.

The present disclosure has been described above with reference to the example embodiments. However, the present disclosure is not limited to thereto. The structure and the details of the present disclosure can be modified in various ways within the spirit and scope of the present disclosure that can be understood by a skilled person in the art.

This application is based upon and claims the benefit of priority from Japanese patent application No. 2017-217495, filed on Nov. 10, 2017, the disclosure of which is incorporated herein in its entirety by reference.

The whole or part of the example embodiments disclosed above can be described as, but not limited to, the following supplementary notes.

(Supplementary Note 1)

A control device comprising:

a deciding unit configured to decide whether or not an interval between generation of a first flow that is generated when performing radio communication between a communication terminal and a base station and generation of a second flow that is generated after the generation of the first flow exceeds a permissible delay time of the first flow; and a determination unit configured to determine deletion of non-transmitted data related to the communication terminal after lapse of the permissible delay time of the first flow when it is decided that the generation interval exceeds the permissible delay time of the first flow.

(Supplementary Note 2)

The control device described in Supplementary note 1, wherein the deciding unit measures the generation interval.

(Supplementary Note 3)

The control device described in Supplementary note 1 or 2 further comprising a management unit configured to manage information related to permissible delay times of the first flow and the second flow, wherein the determination unit obtains the permissible delay time of the first flow from the management unit.

(Supplementary Note 4)

The control device described in any one of Supplementary notes 1 to 3, wherein the determination unit determines deletion of data remaining in a buffer configured to store data included in the first flow and the second flow after lapse of the permissible delay time of the first flow.

(Supplementary Note 5)

The control device described in any one of Supplementary notes 1 to 4, wherein the deciding unit re-decides whether or not the generation interval exceeds the permissible delay time when at least one of the generation interval and the permissible delay time of the first flow is changed.

(Supplementary Note 6)

The control device described in any one of Supplementary notes 1 to 5 further comprising a communication unit configured to transmit information indicating that the non-transmitted data related to the communication terminal after lapse of the permissible delay time of the first flow is deleted to the communication terminal and the base station.

(Supplementary Note 7)

The control device described in Supplementary note 6, wherein the communication unit transmits the information indicating that the non-transmitted data is deleted to the communication terminal, the destination of the information being the base station, and transmits the information indicating that the non-transmitted data is deleted to the base station, the destination of the information being the communication terminal.

(Supplementary Note 8)

The control device described in Supplementary note 6 or 7, wherein the deciding unit detects presence of the non-transmitted data related to the communication terminal after lapse of the permissible delay time of the first flow, and the communication unit instructs the communication terminal or the base station that has the non-transmitted data to delete the non-transmitted data.

(Supplementary Note 9)

The control device described in any one of Supplementary notes 1 to 5 further comprising data a data processing unit configured to delete the non-transmitted data related to the communication terminal after lapse of the permissible delay time of the first flow.

(Supplementary Note 10)

The control device described in Supplementary note 9, wherein the data processing unit deletes the non-transmitted data at a prescribed timing before lapse of the permissible delay time of the first flow.

(Supplementary Note 11)

A control method comprising:

deciding whether or not an interval between generation of a first flow that is generated when performing radio communication between a communication terminal and a base station and generation of a second flow that is generated after the generation of the first flow exceeds a permissible delay time of the first flow; and determining to delete non-transmitted data related to the communication terminal after lapse of the permissible delay time of the first flow when it is decided that the generation interval exceeds the permissible delay time of the first flow.

(Supplementary Note 12)

The control method described in Supplementary note 11, further comprising measuring the generation interval between the first flow and the second flow used in the deciding.

(Supplementary Note 13)

The control method described in Supplementary note 11 or 12, further comprising re-deciding whether or not the generation interval exceeds the permissible delay time when at least one of the generation interval and the permissible delay time of the first flow is changed.

(Supplementary Note 14)

The control method described in any one of Supplementary notes 11 to 13, further comprising transmitting, after it is determined that the non-transmitted data related to the communication terminal after lapse of the permissible delay time of the first flow is deleted, information of the determination to the communication terminal and the base station.

(Supplementary Note 15)

The control method described in any one of Supplementary notes 11 to 13, further comprising deleting, after it is determined that the non-transmitted data related to the communication terminal after lapse of the permissible delay time of the first flow is deleted, the non-transmitted data related to the communication terminal after lapse of the permissible delay time of the first flow.

(Supplementary Note 16)

A program for causing a computer to execute:

deciding of whether or not an interval between generation of a first flow that is generated when performing radio communication between a communication terminal and a base station and generation of a second flow that is generated after the generation of the first flow exceeds a permissible delay time of the first flow; and determination of deleting non-transmitted data related to the communication terminal after lapse of the permissible delay time of the first flow when it is decided that the generation interval exceeds the permissible delay time of the first flow.

(Supplementary Note 17)

The program described in Supplementary note 16 for causing a computer to execute measurement of the generation interval between the first flow and the second flow used in the judgment.

(Supplementary Note 18)

The program described in Supplementary note 16 or 17 for causing a computer to re-decide whether or not the generation interval exceeds the permissible delay time when at least one of the generation interval and the permissible delay time of the first flow is changed.

(Supplementary Note 19)

The program described in any one of Supplementary notes 16 to 18 for causing a computer to execute transmission, after it is determined that the non-transmitted data related to the communication terminal after lapse of the permissible delay time of the first flow is deleted, of information of the determination to the communication terminal and the base station.

(Supplementary Note 20)

The program described in any one of Supplementary notes 16 to 18 for causing a computer to execute deletion, after it is determined that the non-transmitted data related to the communication terminal after lapse of the permissible delay time of the first flow is deleted, of the non-transmitted data related to the communication terminal after lapse of the permissible delay time of the first flow.

REFERENCE SIGNS LIST

10 COMMUNICATION TERMINAL
20 BASE STATION
30 CONTROL DEVICE
31 DECIDING UNIT
32 DETERMINATION UNIT
40 MEC SERVER
41 COMMUNICATION UNIT
42 MANAGEMENT UNIT
50 UE
60 eNB
70 UE
71 DECIDING UNIT
72 DETERMINATION UNIT
73 COMMUNICATION UNIT
74 MANAGEMENT UNIT
75 PROCESSING UNIT

What is claimed is:

1. A control device comprising:

at least one memory storing instructions, and at least one processor configured to execute the instructions to:

decide whether or not an interval between generation of a first flow that is generated when performing radio communication between a communication terminal and a base station and generation of a second flow that is generated after the generation of the first flow exceeds a permissible delay time of the first flow; and determine to delete non-transmitted data related to the communication terminal after lapse of the permissible delay time of the first flow when it is decided that the generation interval exceeds the permissible delay time of the first flow; and transmit information indicating that the non-transmitted data related to the communication terminal after lapse of the permissible delay time of the first flow is deleted to the communication terminal and the base station, wherein the non-transmitted data is deleted from the communication terminal and the base station.

2. The control device according to claim 1, wherein the at least one processor is further configured to execute the instructions to measure the generation interval.

3. The control device according to claim 1, wherein the at least one processor is further configured to execute the instructions to manage information related to permissible delay times of the first flow and the second flow, and obtain the permissible delay time of the first flow.

4. The control device according to claim 1, wherein the at least one processor is further configured to execute the instructions to determine deletion of data remaining in a buffer configured to store data included in the first flow and the second flow after lapse of the permissible delay time of the first flow and transmit information indicating that the data remaining in the buffer is deleted to the communication terminal and the base station; and wherein the data remaining in the buffer is deleted from the communication terminal and the base station.

5. The control device according to claim 1, wherein the at least one processor is further configured to execute the instructions to re-decide-whether or not the generation interval exceeds the permissible delay time when at least one of the generation interval and the permissible delay time of the first flow is changed, determine to delete non-transmitted data related to the communication terminal after lapse of the permissible delay time of the first flow when it is re-decided that the generation interval exceeds the permissible delay time of the first flow, and transmit information indicating that the non-transmitted data related to the communication terminal after lapse of the permissible delay time of the first flow is deleted to the communication terminal and the base station; and wherein the non-transmitted data is deleted from the communication terminal and the base station.

6. The control device according to claim 1, wherein the at least one processor is further configured to execute the instructions to transmit the information indicating that the non-transmitted data is deleted to the communication terminal, the destination of the information being the base station, and transmit the information indicating that the non-transmitted data is deleted to the base station, the destination of the information being the communication terminal.

7. The control device according to claim 1, wherein the at least one processor is further configured to execute the instructions to detect presence of the non-transmitted data related to the communication terminal after lapse of the permissible delay time of the first flow, and instruct the communication terminal or the base station that has the non-transmitted data to delete the non-transmitted data.

8. The control device according to claim 1, wherein the at least one processor is further configured to execute the instructions to delete the non-transmitted data related to the communication terminal after lapse of the permissible delay time of the first flow.

9. The control device according to claim 8, wherein the at least one processor is further configured to execute the instructions to delete the non-transmitted data at a prescribed timing before lapse of the permissible delay time of the first flow.

10. A control method comprising:
deciding whether or not an interval between generation of a first flow that is generated when performing radio communication between a communication terminal and a base station and generation of a second flow that is generated after the generation of the first flow exceeds a permissible delay time of the first flow;
determining to delete non-transmitted data related to the communication terminal after lapse of the permissible delay time of the first flow when it is decided that the generation interval exceeds the permissible delay time of the first flow; and
transmitting information indicating that the non-transmitted data related to the communication terminal after lapse of the permissible delay time of the first flow is deleted to the communication terminal and the base station, wherein
the non-transmitted data is deleted from the communication terminal and the base station.

11. The control method according to claim 10, further comprising measuring the generation interval between the first flow and the second flow used in the deciding.

12. The control method according to claim 10, further comprising re-deciding whether or not the generation interval exceeds the permissible delay time when at least one of the generation interval and the permissible delay time of the first flow is changed;
determining to delete non-transmitted data related to the communication terminal after lapse of the permissible delay time of the first flow when it is re-decided that the generation interval exceeds the permissible delay time of the first flow, and
transmitting information indicating that the non-transmitted data related to the communication terminal after lapse of the permissible delay time of the first flow is deleted to the communication terminal and the base station, wherein
the non-transmitted data is deleted from the communication terminal and the base station.

13. The control method according to claim 10, further comprising transmitting, after it is determined that the non-transmitted data related to the communication terminal after lapse of the permissible delay time of the first flow is deleted, information of the determination to the communication terminal and the base station.

14. The control method according to claim 10, further comprising deleting, after it is determined that the non-transmitted data related to the communication terminal after lapse of the permissible delay time of the first flow is deleted, the non-transmitted data related to the communication terminal after lapse of the permissible delay time of the first flow.

15. A non-transitory computer readable media storing a program for causing a computer to execute:
deciding of whether or not an interval between generation of a first flow that is generated when performing radio communication between a communication terminal and a base station and generation of a second flow that is generated after the generation of the first flow exceeds a permissible delay time of the first flow;
determination of deleting non-transmitted data related to the communication terminal after lapse of the permissible delay time of the first flow when it is decided that the generation interval exceeds the permissible delay time of the first flow; and
transmitting information indicating that the non-transmitted data related to the communication terminal after lapse of the permissible delay time of the first flow is deleted to the communication terminal and the base station, wherein
the non-transmitted data is deleted from the communication terminal and the base station.

16. The non-transitory computer readable media storing the program according to claim 15 for causing a computer to execute measurement of the generation interval between the first flow and the second flow used in the judgment.

17. The non-transitory computer readable media storing the program according to claim 15 for causing a computer to re-decide whether or not the generation interval exceeds the permissible delay time when at least one of the generation interval and the permissible delay time of the first flow is changed, determine to delete non-transmitted data related to the communication terminal after lapse of the permissible delay time of the first flow when it is re-decided that the generation interval exceeds the permissible delay time of the first flow, and transmit information indicating that the non-transmitted data related to the communication terminal after lapse of the permissible delay time of the first flow is deleted to the communication terminal and the base station, wherein the non-transmitted data is deleted from the communication terminal and the base station.

18. The non-transitory computer readable media storing the program according to claim 15 for causing a computer to execute transmission, after it is determined that the non-transmitted data related to the communication terminal after lapse of the permissible delay time of the first flow is deleted, of information of the determination to the communication terminal and the base station.

19. The non-transitory computer readable media storing the program according to claim 15 for causing a computer to execute deletion, after it is determined that the non-transmitted data related to the communication terminal after lapse of the permissible delay time of the first flow is deleted, of the non-transmitted data related to the communication terminal after lapse of the permissible delay time of the first flow.

\* \* \* \* \*